L. E. ALBOTT.
TIRE PROTECTOR.
APPLICATION FILED DEC. 21, 1920.
1,406,803. Patented Feb. 14, 1922.
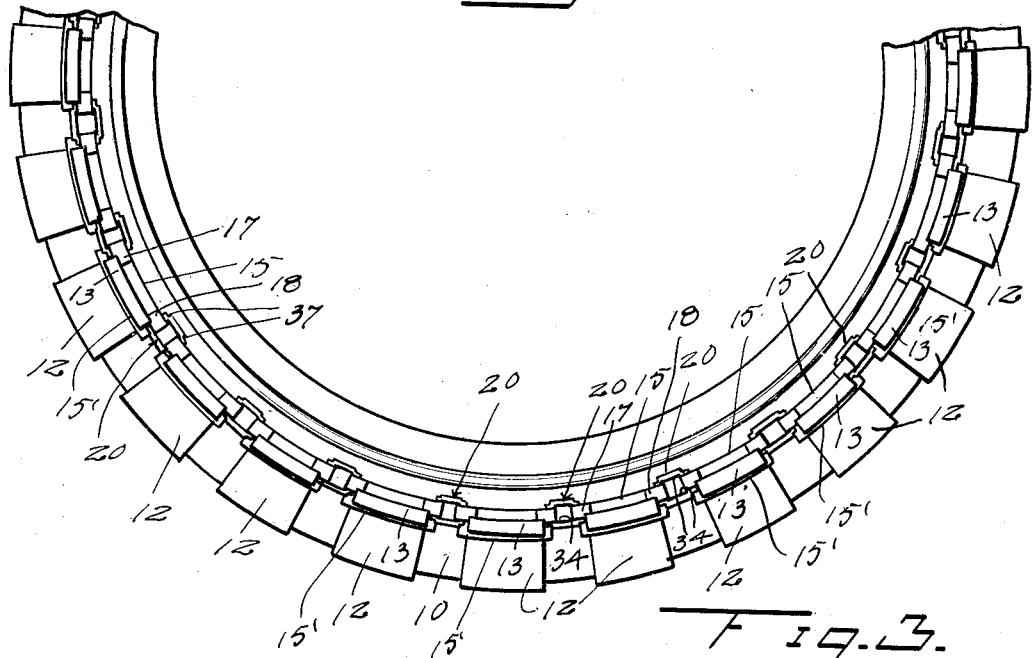
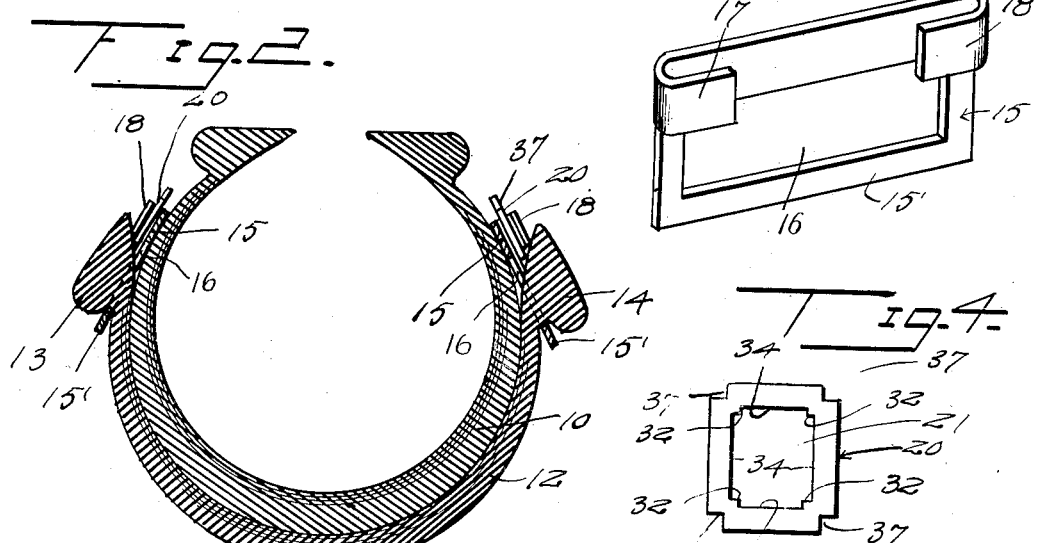
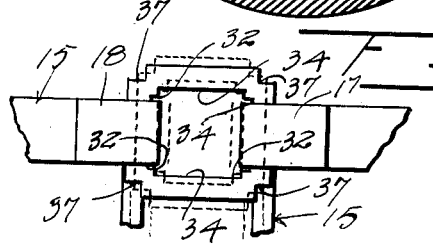
Inventor
L. E. Albott.

UNITED STATES PATENT OFFICE.

LEONARD E. ALBOTT, OF AUGUSTA, KANSAS.

TIRE PROTECTOR.

1,406,803.　　　　Specification of Letters Patent.　　Patented Feb. 14, 1922.

Application filed December 21, 1920. Serial No. 432,298.

*To all whom it may concern:*

Be it known that I, LEONARD E. ALBOTT, a citizen of the United States, residing at Augusta, in the county of Butler and State of Kansas, have invented certain new and useful Improvements in a Tire Protector; and I do hereby declare the following to be a full, clear, and exact description of the invention, such as will enable others skilled in the art to which it appertains to make and use the same.

This invention relates to a tire protecting device, and the object is to provide an article of the type indicated which shall include a series of tread members extending in a circumferential direction, with particular means for connecting these members with each other.

A further object is to provide connecting devices comprising slotted elements for engagement with flanged portions formed on the tread members, and links extending in a circumferential direction and designed to connect the slotted elements and therefore connect the tread members.

A still further object is to provide connecting elements which shall permit of producing tension on the series of tread members, in a direction circumferentially of the wheel.

A still further object is to provide a plurality of slotted plates each having hooks formed thereon, the slotted portions engaging the flanged portions of the tread members, and the hooks being engaged by elongated links which are applied to the hooks, and are then turned angularly for producing tension on the tread members in a circumferential direction.

With the foregoing and other objects in view, the invention consists in the novel construction, combination, and arrangement of elements hereinafter described and claimed, it being understood that modifications may be made within the scope of the claims without departing from the spirit of the invention.

In the accompanying drawing:

Figure 1 is a view in side elevation of a fragmentary portion of the casing of a pneumatic tire equipped with a protection constructed in accordance with my invention.

Figure 2 is a sectional view taken on a plane extending transversely through the casing and one of the tread members of the protector.

Figure 3 is a detail perspective view of the connecting devices.

Figure 4 is a detail view in side elevation of one of the links, and

Figure 5 is a view illustrating the connection between the links and connecting devices.

The tire to be protected is designated 10, and the individual tread members to be applied to the tire are shown at 12, these members being connected in the particular manner hereinafter specified.

Each of the tread members includes the usual flanges 13 and 14, it being the intention to form these members 12 from discarded tires.

The connecting devices include plates 15, approximately rectangular in form and provided with rectangular slots 16, and further provided with hooks 17 and 18 deflected toward each other and having their inner portions extending in a direction approximately parallel with the surface of the plates with which they are connected.

Two of the plates 15 are employed for mounting or connecting each tread member 12, these plates being positioned in the manner illustrated, the outer portion 15' of each plate being in approximate engagement with the flange on that side of the tread. The plates being employed in pairs, the hooks are located opposite each other, and are connected by links 20—that is to say the hooks of adjacent plates extending in a circumferential direction are so connected.

These links 20 are preferably of rectangular form and are provided with central openings or slots 21, longer in one direction than in the other, projecting elements 32 being formed in the corner portions of the central opening. The space 34 is therefore provided on each side of the links and is proportioned to receive and directly retain the bill portion of the adjacent hook,—the links being first applied so that the hooks will properly encircle the longer sides of the links. The links are then turned angularly in order that the shorter sides may directly engage the hooks, thereby producing tension circumferentially of the wheel, for bringing the tread members 12 into intimate contact with the tire per se. The links may be further provided with cut-away portions 37 at the corners thereof. It may be added that the width of the individual tread members, in a circumferential direction is approximately two inches when the protecting device is to be applied to a thirty inch tire. Sizes or proportions may of course vary as circumstances dictate.

Having thus described the invention, what I claim is:—

1. In a tire protecting device, a series of tread members arranged circumferentially of the tire, and connecting means for the tread members, comprising a plurality of slotted plates for engagement with the approaching portions of said tread members, hooks on the plates projecting toward each other, and links for connecting the hooks of adjacent plates in a direction circumferentially of the wheel on which the tire and protecting device are mounted.

2. In a tire protecting device, a series of tread members each provided with flanged portions on the approaching edges thereof, slotted plates receiving the flanged portions of the tread members and extending toward each other on opposite sides of the individual tread members, and means for connecting adjacent plates and producing tension therebetween.

3. In a tire protecting device, a series of tread members each provided with flanged portions, slotted plates through which the respective flanged portions extend, said plates being oppositely located in approximately the same plane, hooks on the plates extending toward each other on the individual plate members and opposite to each other on adjacent plate members in a circumferential direction, and angular links for connecting the hooks, the links being longer in one direction than in the other.

4. In a tire protecting device, a series of tread members each provided with flanged portions, slotted plates through which the respective flanged portions extend, said plates being oppositely located in approximately the same plane, hooks on the plates extending toward each other on the individual plate members and opposite to each other on adjacent plate members in a circumferential direction, and angular links for connecting the hooks, the links being longer in one direction than in the other, the links being each provided with recesses within which the hooks to be connected are retained when tension is produced circumferentially of the wheel mounting the tire to be protected.

5. The combination with detachable tread members having flanged portions alongside thereof, of plate members provided with slots engaging said portions for mounting therefrom, connecting link members, certain of the members having hooks, and others of said members being engageable with the hooks.

In testimony whereof I affix my signature in presence of two witnesses.

LEONARD E. ALBOTT.

Witnesses:
R. L. McCAULEY,
WILL D. KINNAMAN.